United States Patent
Morton, III

(10) Patent No.: US 7,413,359 B2
(45) Date of Patent: Aug. 19, 2008

(54) METHOD AND APPARATUS FOR PRINTING

(75) Inventor: Charles G. Morton, III, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 402 days.

(21) Appl. No.: 11/334,868

(22) Filed: Jan. 19, 2006

(65) Prior Publication Data

US 2007/0166090 A1   Jul. 19, 2007

(51) Int. Cl.
G03G 15/00   (2006.01)
(52) U.S. Cl. ................. 400/188; 399/361; 399/363; 399/364
(58) Field of Classification Search ............... 399/361, 399/363, 364, 365, 367, 368, 369, 373, 374, 399/377, 381, 383, 388, 391, 401; 347/104; 400/188
See application file for complete search history.

(56) References Cited

U.S. PATENT DOCUMENTS

| 4,231,561 | A |   | 11/1980 | Kaneko et al. |
| 5,074,537 | A |   | 12/1991 | van Rijn |
| 5,974,283 | A |   | 10/1999 | Cho |
| 6,134,417 | A |   | 10/2000 | Fukasawa |
| 6,160,642 | A | * | 12/2000 | Mui et al. ................. 358/498 |
| 2007/0003339 | A1 | * | 1/2007 | Edwards et al. ............. 399/364 |

FOREIGN PATENT DOCUMENTS

| JP | 09065086 | A | * | 3/1997 |
| JP | 10016317 | A | * | 1/1998 |
| JP | 10239921 | A | * | 9/1998 |

* cited by examiner

Primary Examiner—Daniel J. Colilla
Assistant Examiner—'Wynn' Q Ha
(74) Attorney, Agent, or Firm—Haynes and Boone, LLP

(57) ABSTRACT

A printing apparatus includes a base coupled to a copying device and a printing device. A feed mechanism is provided which is operable to couple to the base in one of either a first position or a second position, whereby the feed mechanism is operable to feed a document to the copying device in the first position and the feed mechanism is operable to manipulate a printing medium to allow the printing device to print to a plurality of sides of the printing medium in the second position.

21 Claims, 13 Drawing Sheets

METHOD AND APPARATUS FOR PRINTING

BACKGROUND

The present disclosure relates generally to information handling systems, and more particularly to printing with a printing device which is coupled to an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include a printing apparatus which is coupled to the information handling system in order to allow the copying and printing of documents to and from the information handling system. The copying of documents to the information handling system is typically accomplished through the use of an automatic document feeder, which allows a plurality of documents to be fed to a copying device in the printing apparatus and copied. The printing of documents from the information handling system can raise issues when that printing requires printing on both sides of a printing medium.

The printing on both sides of a printing medium can be accomplished with the use of a duplex printing mechanism. The duplex printing mechanism is coupled to the printing apparatus and manipulates the printing medium such that a printing device in the printing apparatus may print on both sides of the printing medium. However, because not all users typically need this ability to print on both sides of the printing medium, the printing apparatus is typically shipped by itself, and those users which require the ability to print on both sides of the printing medium are shipped a duplex printing mechanism separately from the printing apparatus in order to prevent shipping empty volume when only the printing apparatus is ordered by the user. This separate shipping of the printing apparatus and the duplex printing mechanism raises costs.

Accordingly, it would be desirable to provide for printing absent the disadvantages found in the prior methods discussed above.

SUMMARY

According to one embodiment, a printing apparatus includes a base, a copying device coupled to the base, a printing device coupled to the base, and a feed mechanism which is operable to couple to the base in one of either a first position or a second position, whereby the feed mechanism is operable to feed a document to the copying device in the first position and the feed mechanism is operable to manipulate a printing medium to allow the printing device to print to a plurality of sides of the printing medium in the second position.

BRIEF DESCRIPTION OF THE DRAWINGS

FIG. 2b is a rear perspective view illustrating an embodiment of the printing apparatus of FIG. 2a.

FIG. 3b is a bottom perspective view illustrating an embodiment of a feed mechanism of FIG. 3a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
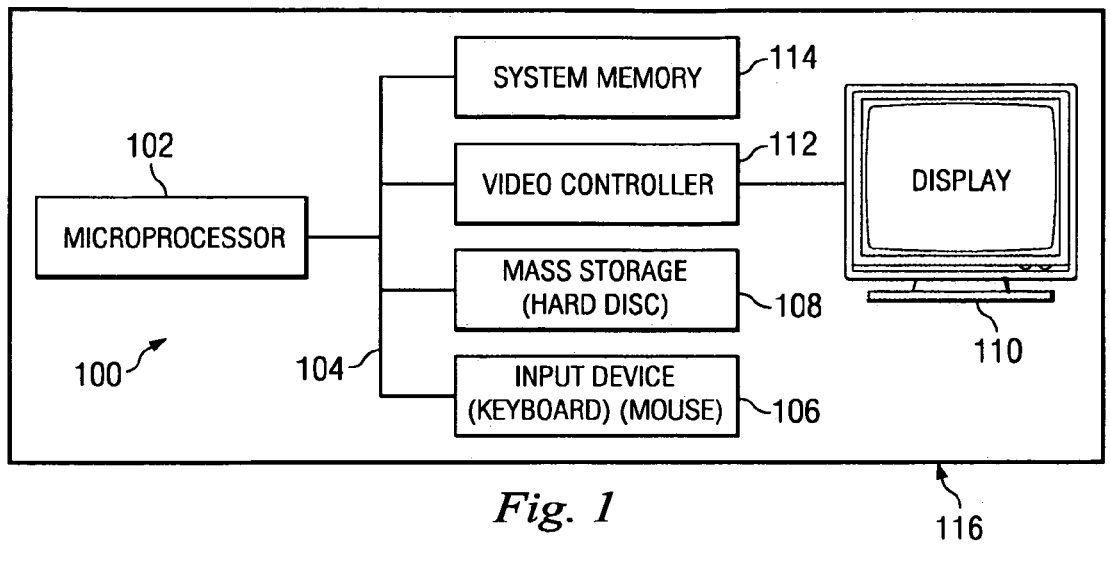
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other buses and intermediate circuits can be deployed between the components described above and microprocessor 102 to facilitate interconnection between the components and the microprocessor.

Figure 2A:
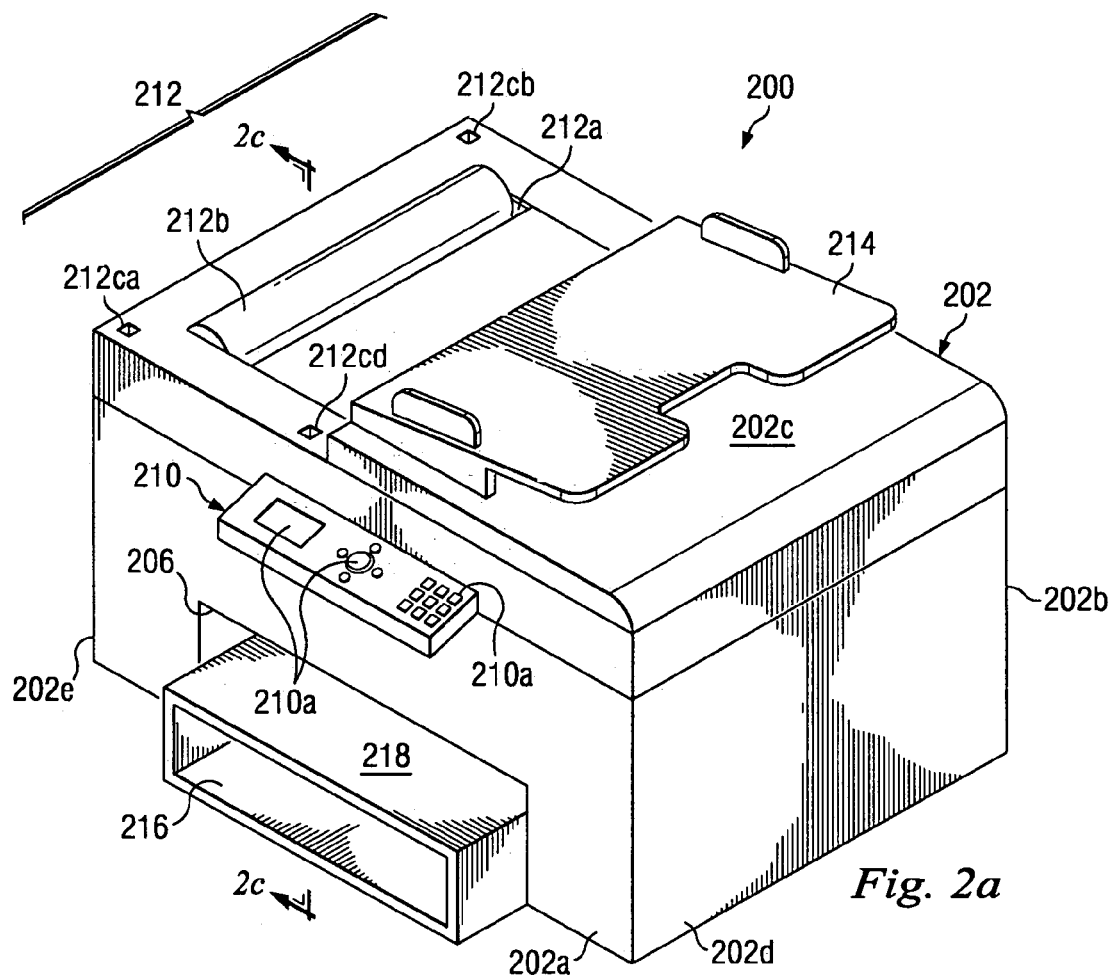
FIG. 2a is a front perspective view illustrating an embodiment of a printing apparatus.
Figure 2B:
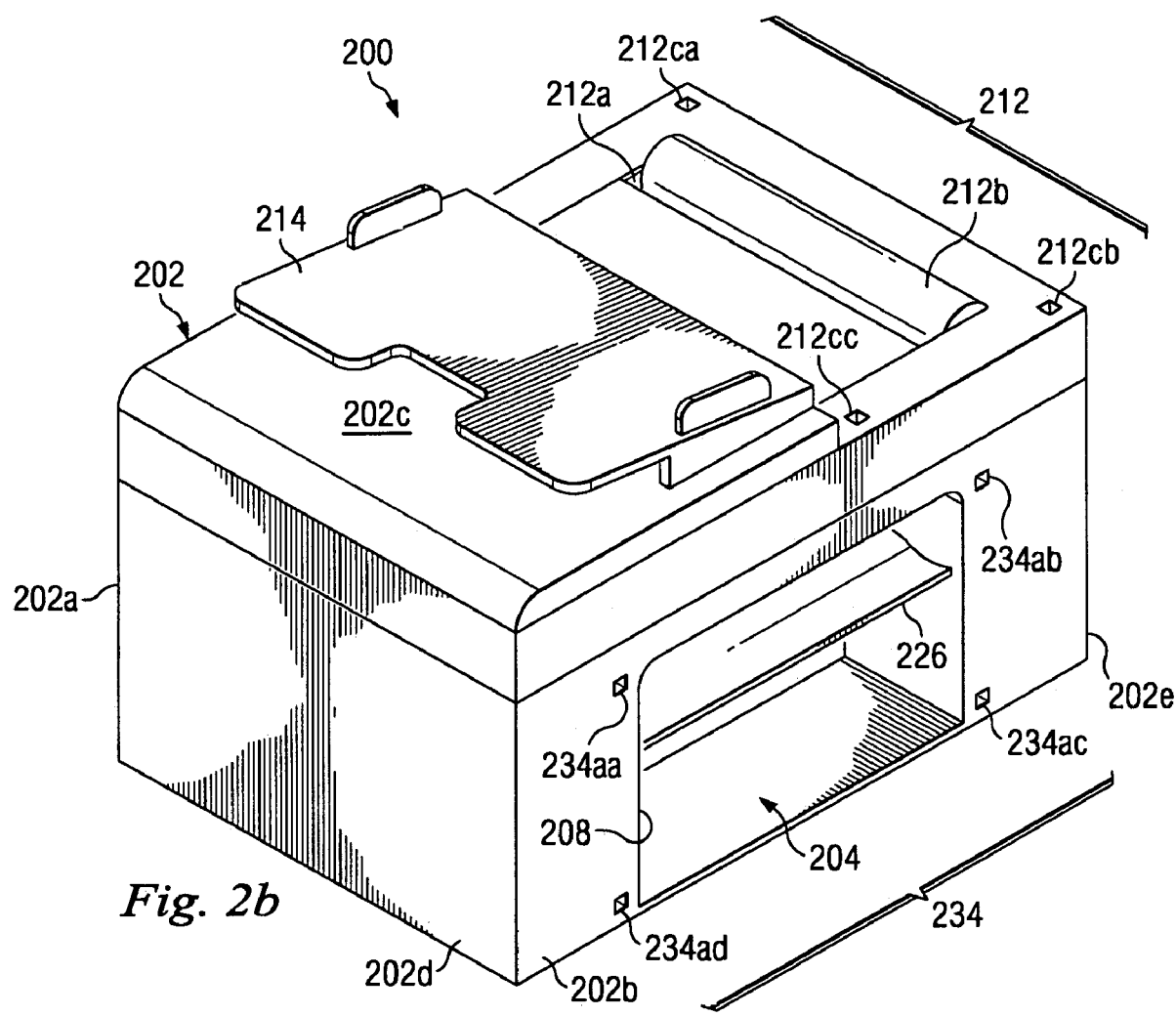
Figure 2C:
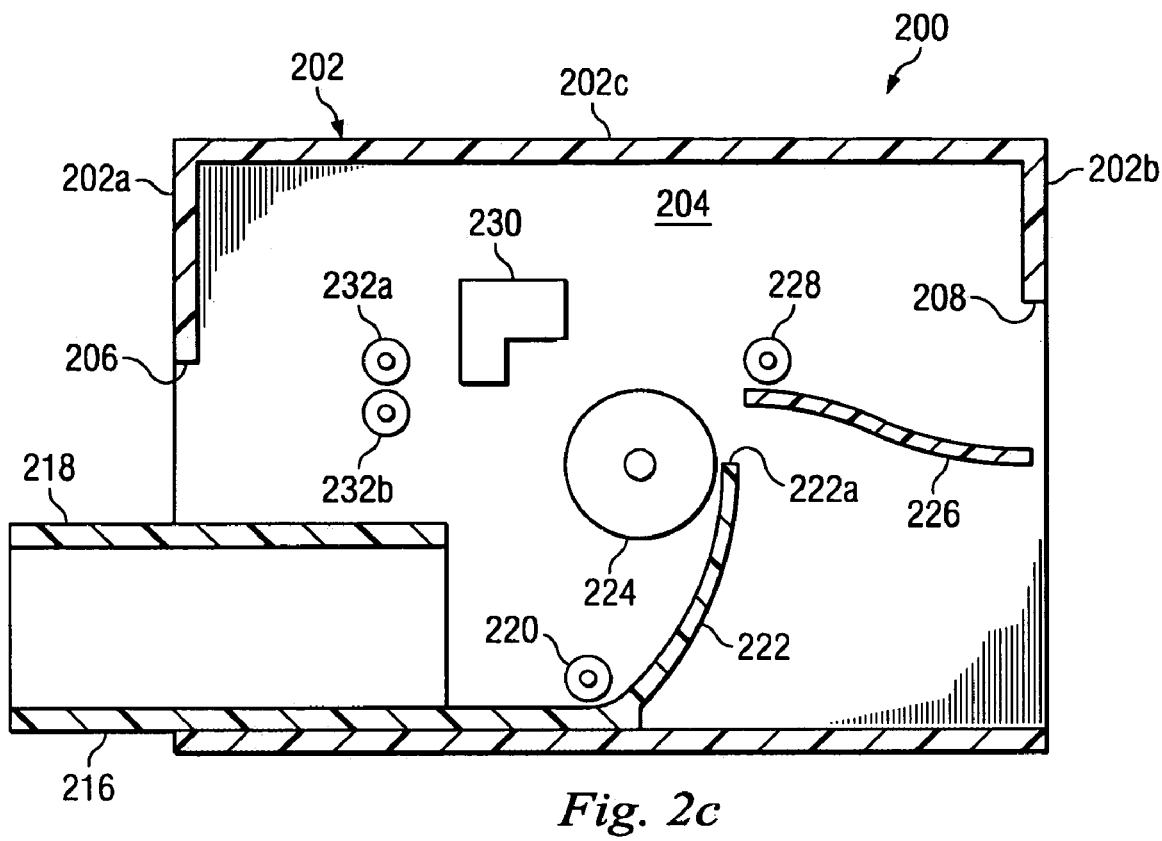
FIG. 2c is a cross sectional view illustrating an embodiment of the printing apparatus of FIGS. 2a and 2b.

Referring now to FIGS. 2a, 2b, and 2c, a printing apparatus 200 is illustrated. In an embodiment, the printing apparatus 200 may be coupled to an information handling system such as, for example, the information handling system 100, described above with reference to FIG. 1. The printing apparatus 200 includes a base 202 having a front surface 202a, a rear surface 202b located opposite the front surface 202a, a top surface 202c extending between the front surface 202a and the rear surface 202b, and a plurality of opposing side surfaces 202d and 202e extending between the front surface 202a, the rear surface 202b, and the top surface 202c. A printing enclosure 204 is defined by the base 202 and located between the front surface 202a, the rear surface 202b, the top surface 202c, and the sides surfaces 202d and 202e. A printing medium passageway 206 is defined by the base 202, located on the front surface 202a of the base 202, and provides access to the printing enclosure 204. A print duplexing passageway 208 is defined by the base 202, located on the rear surface 202b of the base 202, and provides access to the printing enclosure 204. A printer control panel 210 extends from the front surface 202a of the base 202, is located adjacent the printing medium passageway 206, and includes a plurality of printing apparatus controls 210a. A feed mechanism coupling section 212 is defined by the base 202 and located on the top surface 202c of the base 202 adjacent the side surface 202e. The feed mechanism coupling section 212 including a copying device 212a which is extends partially along the width of the feed mechanism coupling section 212. A feed member 212b is located on in the feed mechanism coupling section 212 and adjacent the copying device 212a. A plurality of first position coupling members 212ca, 212cb, 212cc, and 212cd are included on the feed mechanism coupling section 212, defined by the base 202, and located in a spaced apart relationship about the copying device 212a and the feed member 212b. In an embodiment, at least one of the first position coupling members 212ca, 212cb, 212cc, and 212cd includes a feed mechanism detection device (not shown), the function of which will be described below. A document tray 214 is located on the top surface 202c of the base 202 and adjacent the feed mechanism coupling section 212.

A printing medium input tray 216 extends from the printing enclosure 204, through the printing medium passageway 206, and out past the front surface 202a of the base 202. A printing medium output tray 218 is located in a substantially parallel, spaced apart relationship from the printing medium input tray 216, extends from the printing enclosure 204, through the printing medium passageway 206, and out past the front surface 202a of the base 202. A feed member 220 is located in the printing enclosure 204 and adjacent an end of the printing medium input tray 216. A printing medium ramp 222 is located in the printing enclosure 204 and adjacent the feed member 220, extends from an end of the printing medium input tray 216, and includes a distal end 222a. A feed member 224 is located in the printing enclosure 204 and adjacent an the distal end 222a of the printing medium ramp 222. A printing medium ramp 226 is located in the printing enclosure 204, adjacent the feed member 224, and includes a feed member 228 located adjacent its top surface. A printing device 230 is located in the printing enclosure 204 and adjacent the feed member 224 opposite the printing medium ramp 226. A plurality of feed members 232a and 232b are positioned in a spaced apart relationship and located in the printing enclosure 204 and adjacent the printing device 230 opposite the feed member 224.

A feed mechanism coupling section 234 is located on the rear surface 202b of the base 202 and includes a plurality of second position coupling members 234aa, 234ab, 234ac, and 234ad which are defined by the base 202 and positioned in a spaced apart relationship about the print duplexing passageway 208. In an embodiment, at least one of the second position coupling members 234aa, 234ab, 234ac, and 234ad includes a feed mechanism detection device (not shown), the function of which will be described below.

Figure 3A:
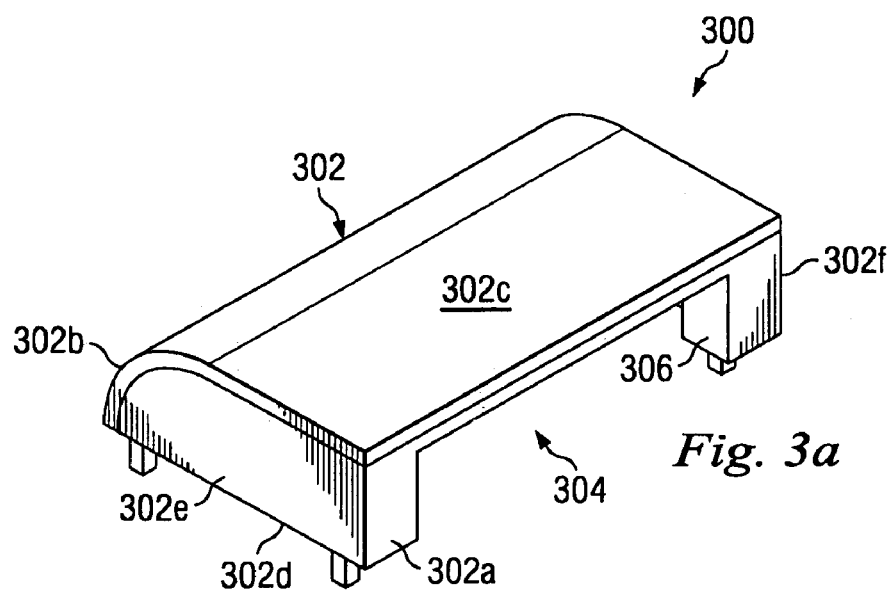
FIG. 3a is a top perspective view illustrating an embodiment of a feed mechanism used with the printing apparatus of FIGS. 2a, 2b, and 2c.
Figure 3B:
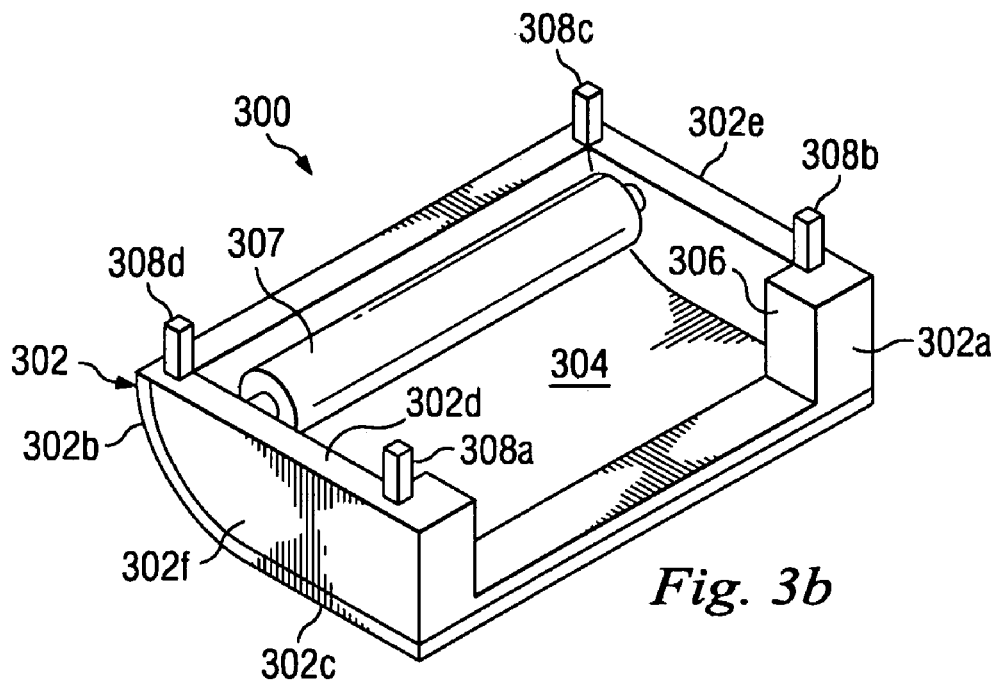

Referring now to FIGS. 3a and 3b, a feed mechanism 300 is illustrated. The feed mechanism 300 includes a base 302 having a front wall 302a, a rear wall 302b located opposite the front wall 302a, a top wall 302c extending between the front wall 302a and the rear wall 302b, a bottom edge 302d located opposite the top wall 302c, and a plurality of opposing side walls 302e and 302f extending between the front wall 302a, the rear wall 302b, the top wall 302c, and the bottom edge 302d. A feed enclosure 304 is defined by the base 302 and located between the front wall 302a, the rear wall 302b, the top wall 302c, the bottom edge 302d, and the side walls 302e and 302f. A document passageway 306 is defined by base 302 and extends through the front wall 302a to the feed enclosure 304. A feed member 306 is located in the feed enclosure 304, extends between the side walls 302e and 302f, and is positioned adjacent the rear wall 302b. A plurality of coupling members 308a, 308b, 308c, and 308d extend from the bottom edge 302d and are located in a spaced apart relationship at the corners of the base 302.

Referring now to FIGS. 2a, 2b, 3a, 3b, 4a, 4b, 4c, 4d, and 4f, a method 400 for printing is illustrated. The method 400 begins at step 402 where the printing apparatus 200, described above with reference to FIGS. 2a and 2b, is provided. The method 400 then proceeds to step 404 where the feed mechanism 300, described above with reference to FIGS. 3a and 3b, is coupled to the printing apparatus 200 in a first position. The feed mechanism 300 is coupled to the printing apparatus 200 by positioning the feed mechanism 300 adjacent the feed mechanism coupling section 212 such that the coupling members 308a, 308b, 308c, and 308d on the feed mechanism 300 are positioned adjacent the first position coupling members 212cc, 212cd, 212ca, and 212cb, respectively, on the printing apparatus 200. The coupling members 308a, 308b, 308c, and 308d on the feed mechanism 300 may then be matingly engaged with the first position coupling members 212cc, 212cd, 212ca, and 212cb, respectively, on the printing apparatus 200, which results in the feed mechanism 300 being coupled to the printing apparatus in a first position A, illustrated in FIG. 4b. In an embodiment, the mating engagement of the coupling members 308a, 308b, 308c, and 308d on the feed mechanism 300 with the first position coupling members 212cc, 212cd, 212ca, and 212cb, respectively, results in a feed mechanism detection device (not shown), which maybe located in one or all of the first position coupling members 212ca, 212cb, 212cc, and 212cd, detecting the feed mechanism 300 in the first position A and sending a signal to an information handling system such as, for example, the information handling system 100, described above with reference to FIG. 1, that the feed mechanism 300 is in the first position A such that the printing apparatus 200 may be set in a document feed mode. In an embodiment, the feed mechanism detection device may be a mechanical switch, an electrical sensor, or a variety of other detection devices known in the art. In an embodiment, the information handling system 100 includes software which is coupled to the feed mechanism detection device and the microprocessor 102 such that the microprocessor may place the printing apparatus 200 in the document feed mode.

Figure 4A:
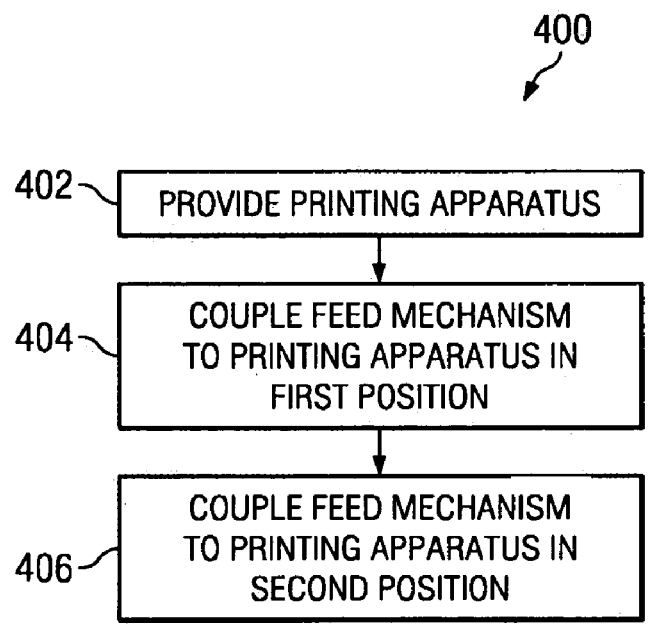
FIG. 4a is a flow chart illustrating an embodiment of a method for printing.
Figure 4B:
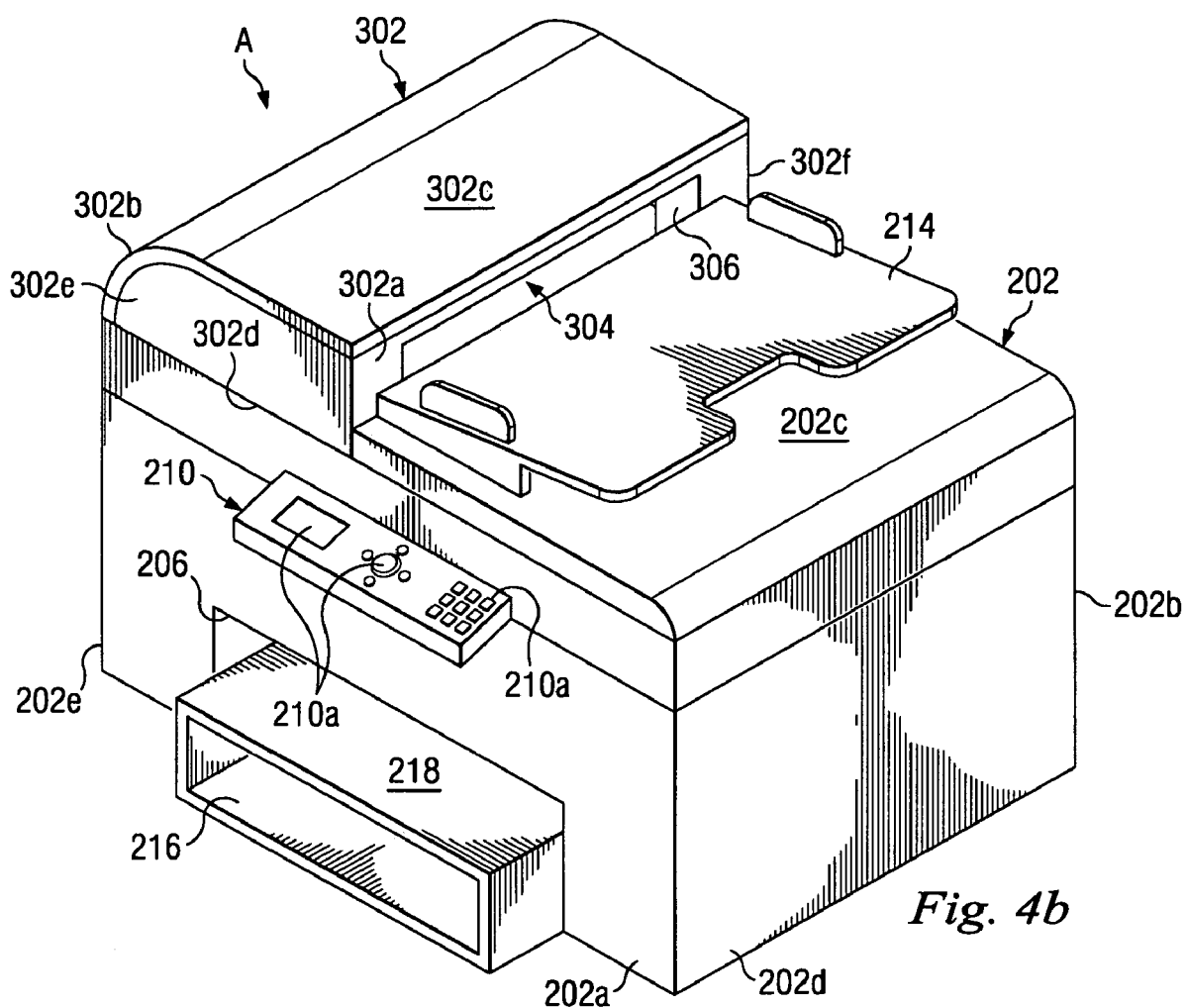
FIG. 4b is a perspective view illustrating an embodiment of the feed mechanism of FIGS. 3a and 3b coupled to the printing apparatus of FIGS. 2a, 2b, and 2c in a first position.
Figure 4C:
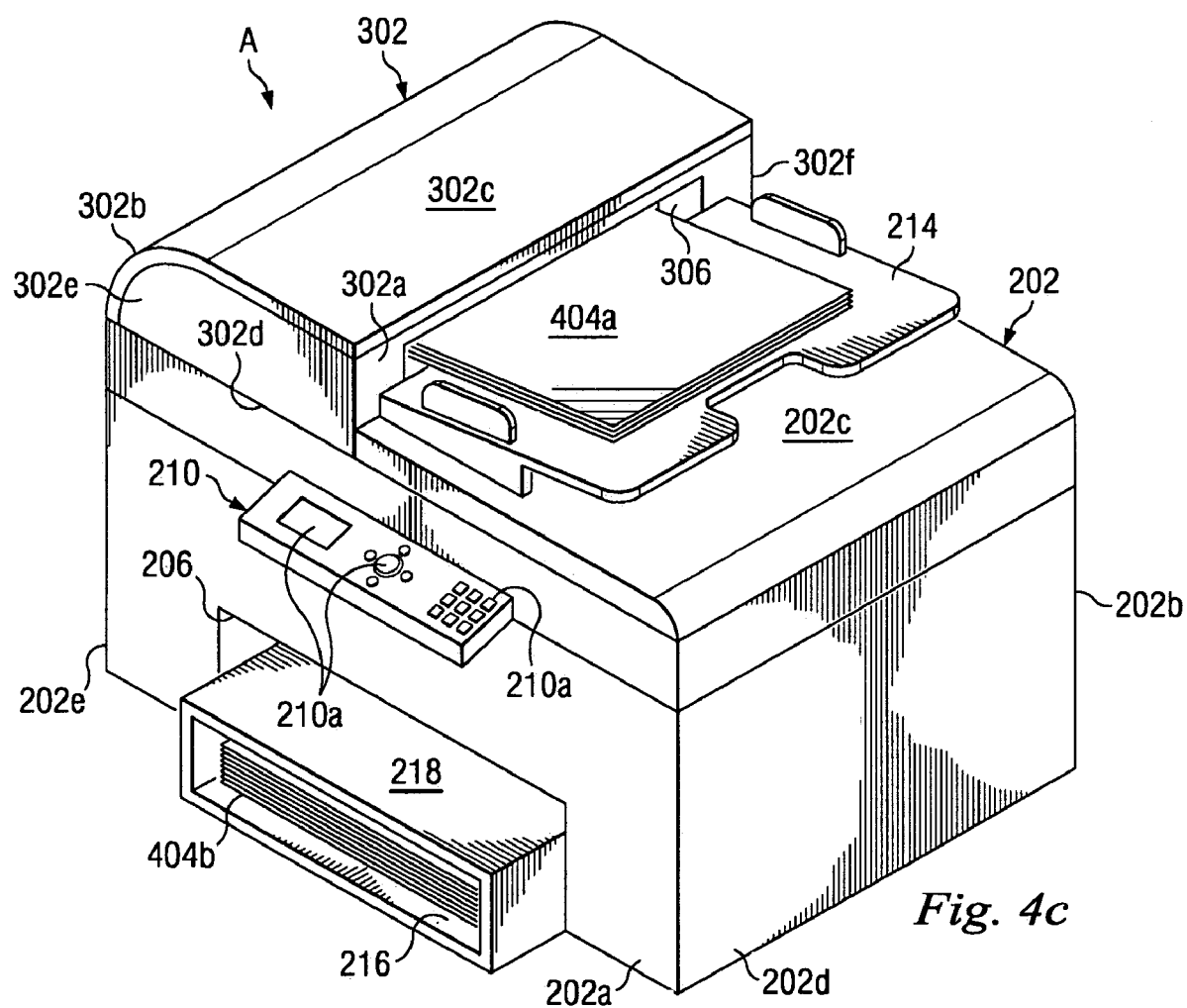
FIG. 4c is a perspective view illustrating an embodiment of the feed mechanism and the printing apparatus of FIG. 4b including a plurality of documents and printing media positioned on the printing apparatus.

With the feed mechanism 300 positioned in the first position A and the printing apparatus 200 set in a document feed mode, a plurality of documents 404a may be positioned in the document tray 214, as illustrated in FIG. 4c. The documents 404a may then be fed to the copying device 212a using the feed mechanism 300 using method known in the art such as, for example, by engaging the documents 404a with the feed member 307 on the feed mechanism 300 and the with the feed member 212b on the printing apparatus 200 in order to move the documents 404a from the document tray 214, through the document passageway 306, into the feed enclosure 304, and past the copying device 212a. In an embodiment, the feed mechanism 300 may be configured using methods known in the art such that a plurality of sides of the documents 404a may be moved by the copying device 212a in order for the copying device 212a to copy a plurality of sides of each of the documents 404a.

Figure 4D:
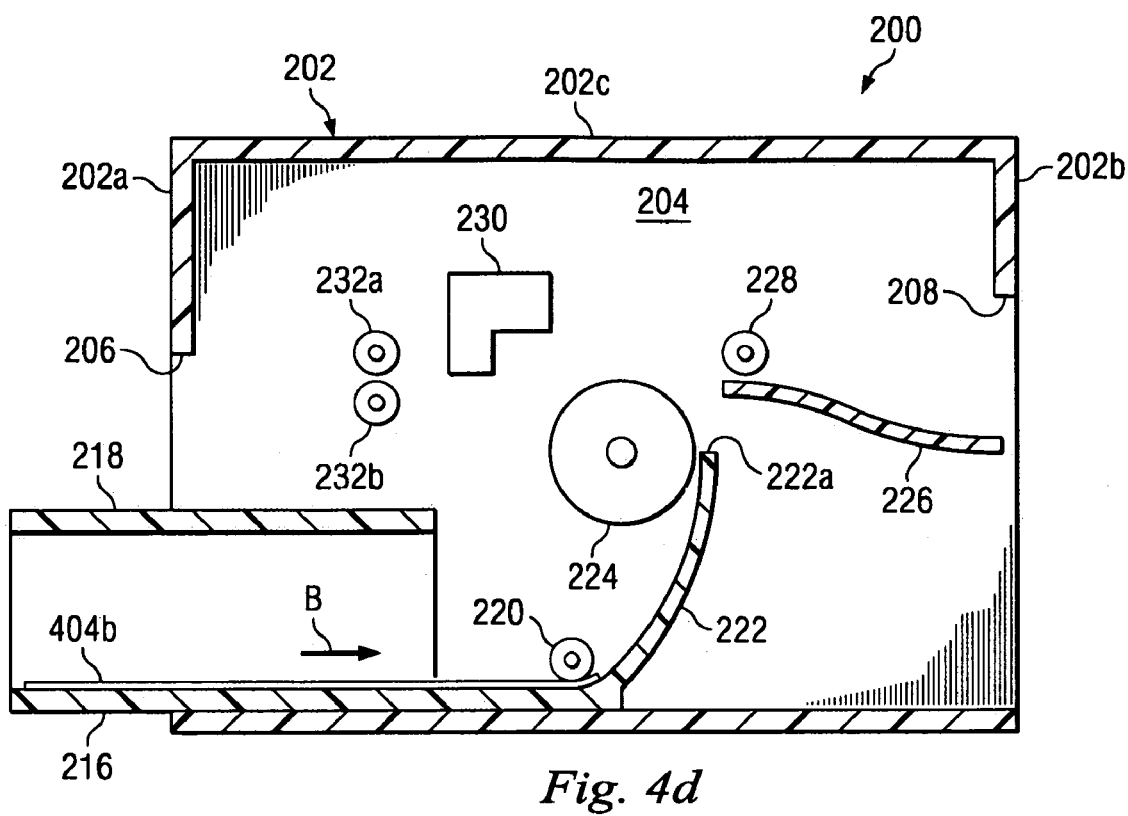
FIG. 4d is a cross sectional view illustrating an embodiment of a printing medium moving through a first paper path in the printing apparatus of FIG. 4b.
Figure 4E:
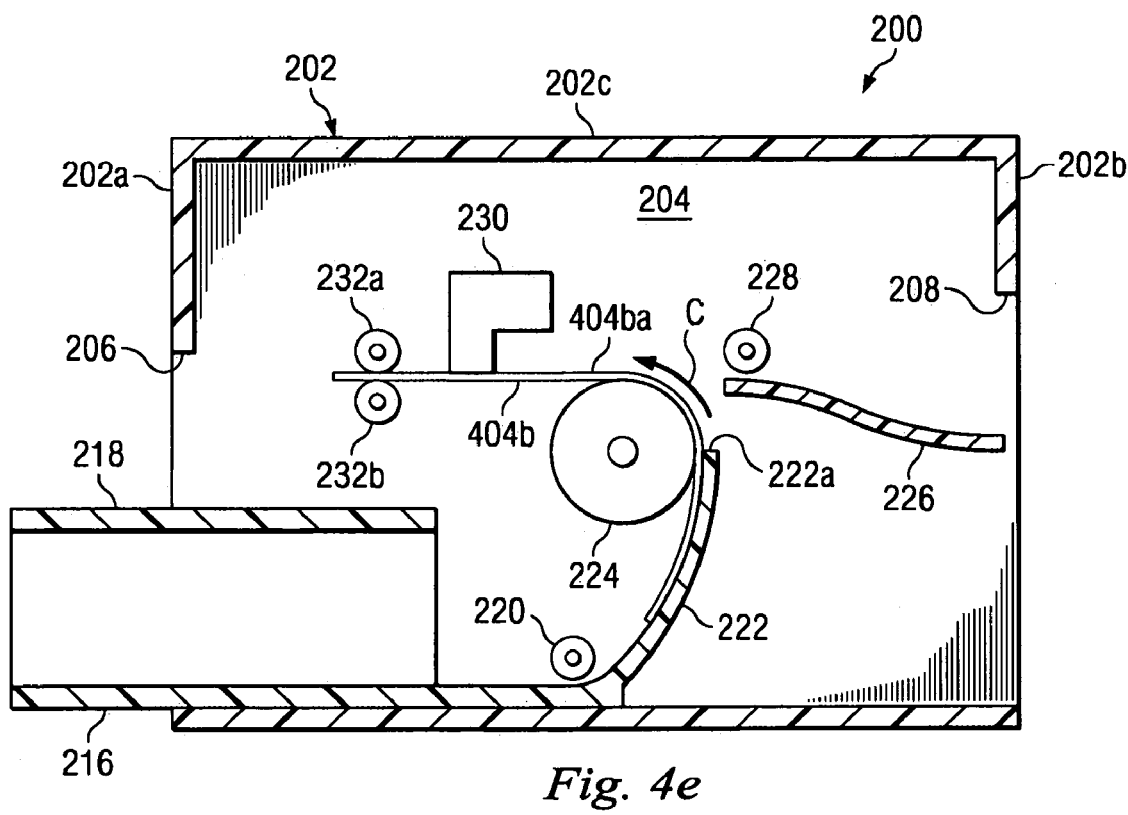
FIG. 4e is a cross sectional view illustrating an embodiment of a printing medium moving through a first paper path in the printing apparatus of FIG. 4b.
Figure 4F:
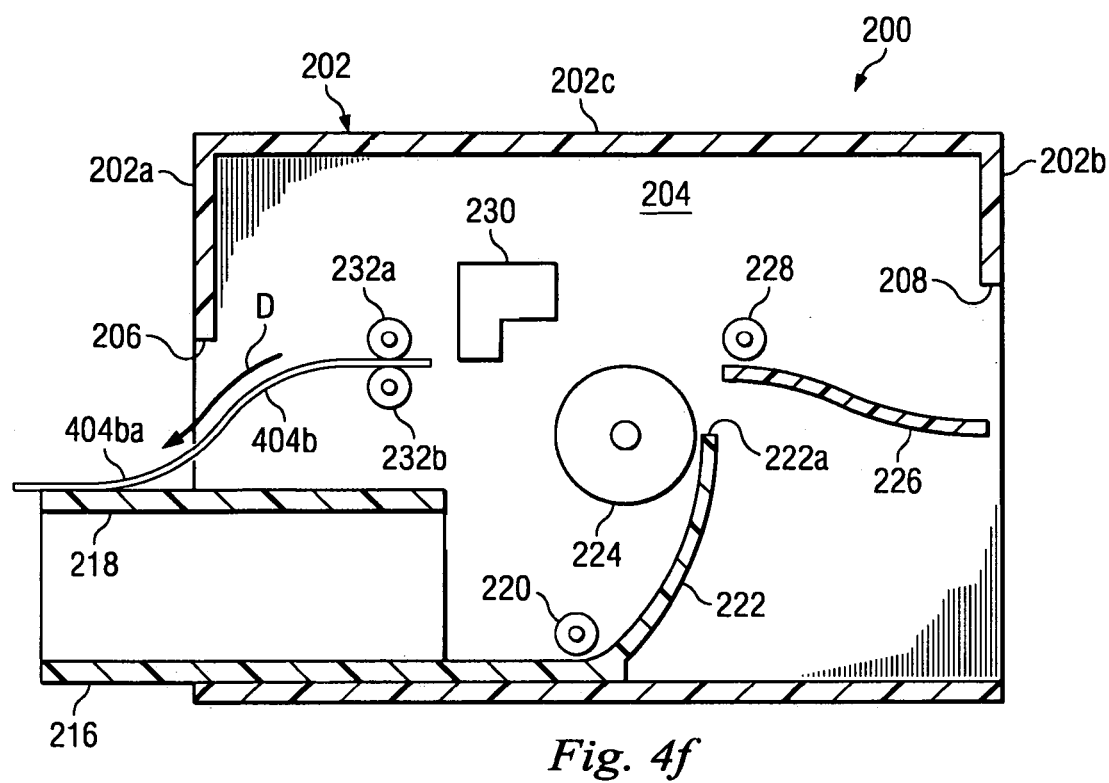
FIG. 4f is a cross sectional view illustrating an embodiment of a printing medium moving through a first paper path in the printing apparatus of FIG. 4b.
Figure 4H:
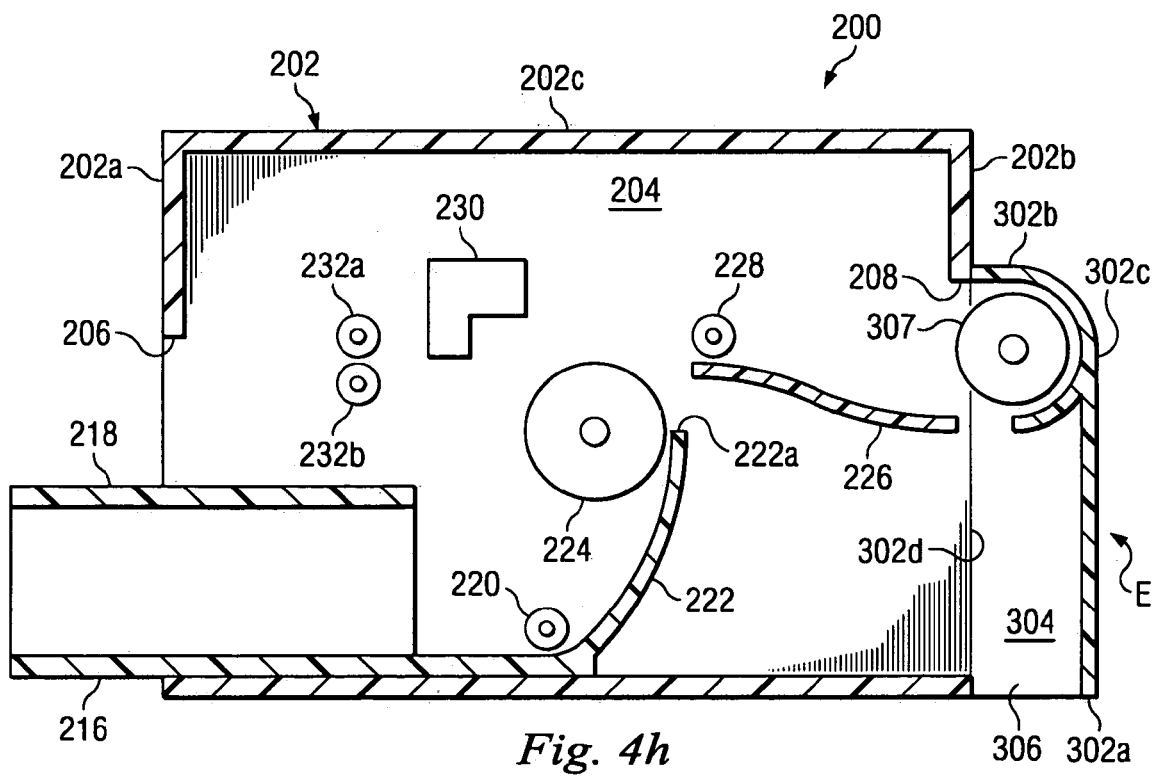
FIG. 4h is a cross sectional view illustrating an embodiment of the feed mechanism and the printing apparatus off FIG. 4g.
Figure 4G:
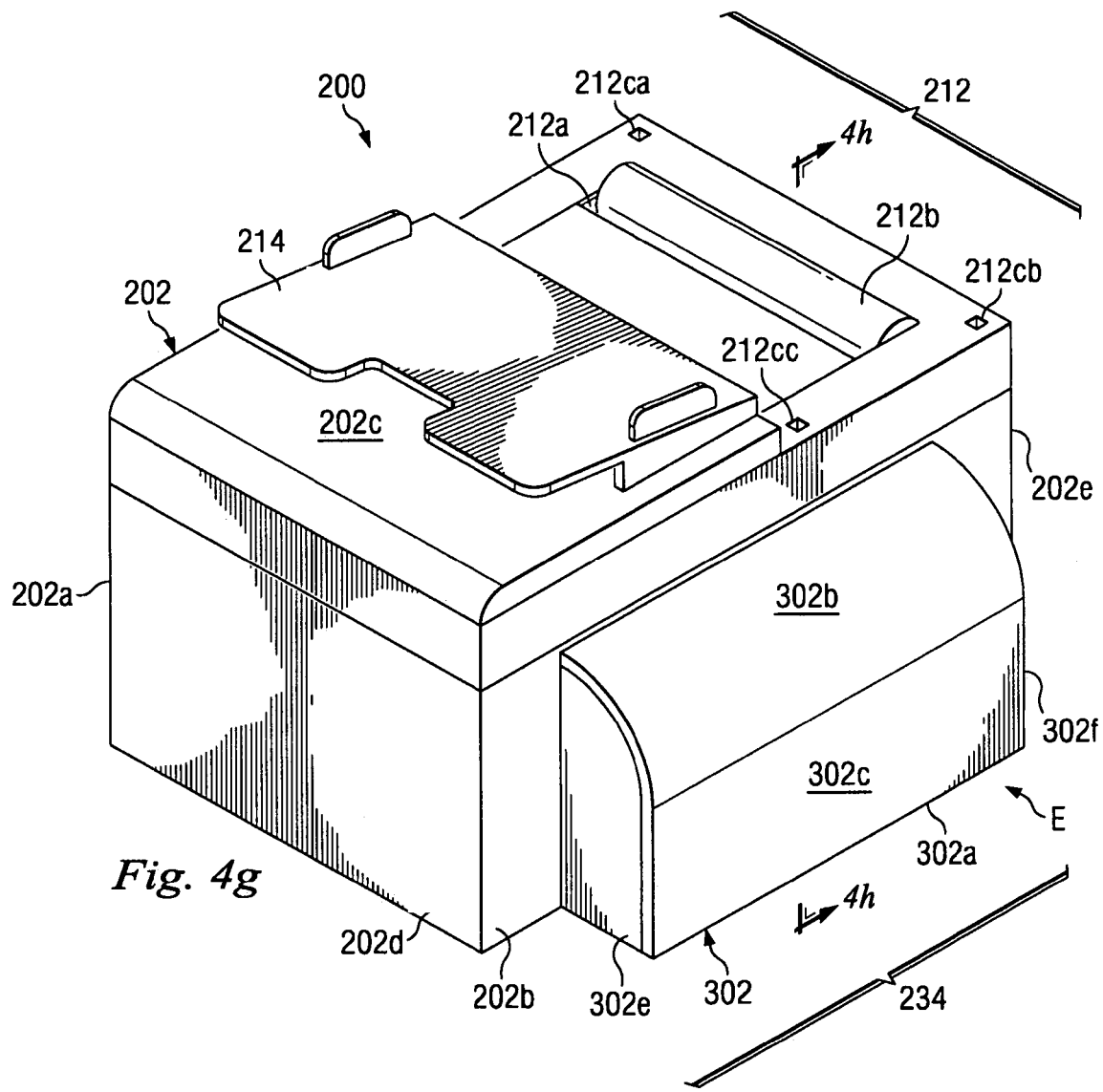
FIG. 4g is a perspective view illustrating an embodiment of the feed mechanism of FIGS. 3a and 3b coupled to the printing apparatus of FIGS. 2a, 2b, and 2c in a second position.

With the feed mechanism 300 positioned in the first position A and the printing apparatus 200 set in the document feed mode, a plurality of printing media 404b may be positioned on the printing medium input tray 216, as illustrated in FIG. 4c. The setting of the printing apparatus 200 in the document feed mode activates a first printing medium path in the printing apparatus 200. The first printing medium path manipulates the printing medium 404b as follows: The printing medium 404b is engaged by the feed member 220, as illustrated in FIG. 4d. The feed member 220 moves the printing medium 404b in a direction B from the printing medium input tray 216, through the printing medium passageway 206, into the printing enclosure 204, and up the printing medium ramp 222 such that the printing medium 404b engages the feed member 224. The feed member 224 moves the printing medium 404b in a direction C past the printing device 230 an into engagement with the feed members 232a and 232b. As the printing medium 404b moves past the printing device 230, the printing device 230 may print images on a first side 404ba of the printing medium 404b, as illustrated in FIG. 4e. The feed members 232a and 232b then move the printing medium 404b in a direction D through the printing medium passageway 206 and out of the printing enclosure 204 and deposit the printing medium 404b onto the printing medium output tray 218, as illustrated in FIG. 4f. In an embodiment, the printing enclosure 204 may includes a variety of different feed members, ramps, and other devices known in the art in order to provide a first printing medium path with which to print to the first side 404ba of the printing medium 404b.

Referring now to FIGS. 2a, 2b, 3a, 3b, 4a, 4g, 4h, 4i, 4j, 4k, 4l, 4m, 4n, and 4o, the method 400 then proceeds to step 406 where the feed mechanism 300, described above with reference to FIGS. 3a and 3b, is coupled to the printing apparatus 200 in a second position. The feed mechanism 300 is removed from the feed mechanism coupling section 212 and is then is coupled to the printing apparatus 200 by positioning the feed mechanism 300 adjacent the feed mechanism coupling section 234 such that the coupling members 308a, 308b, 308c, and 308d on the feed mechanism 300 are positioned adjacent the second position coupling members 234ac, 234ad, 234aa, and 234ab, respectively, on the printing apparatus 200. The coupling members 308a, 308b, 308c, and 308d on the feed mechanism 300 may then be matingly engaged with the second position coupling members 234ac, 234ad, 234aa, and 234ab, respectively, on the printing apparatus 200, which results in the feed mechanism 300 being coupled to the printing apparatus in a second position E, illustrated in FIGS. 4g and 4h. In an embodiment, the mating engagement of the coupling members 308a, 308b, 308c, and 308d on the feed mechanism 300 with the second position coupling members 234ac, 234ad, 234aa, and 234ab, respectively, results in a feed mechanism detection device (not shown), which may be located in one or all of the first position coupling members 212ca, 212cb, 2112cc, and 212cd, detecting the feed mechanism 300 in the second position E and sending a signal to an information handling system such as, for example, the information handling system 100, described above with reference to FIG. 1, that the feed mechanism 300 is in the second position E such that the printing apparatus 200 may be set in a print duplex mode. In an embodiment, the feed mechanism detection device may be a mechanical switch, an electrical sensor, or a variety of other detection devices known in the art. In an embodiment, the information handling system 100 includes software which is coupled to the feed mechanism detection device and the microprocessor 102 such that the microprocessor may place the printing apparatus 200 in the print duplex mode.

Figure 4I:
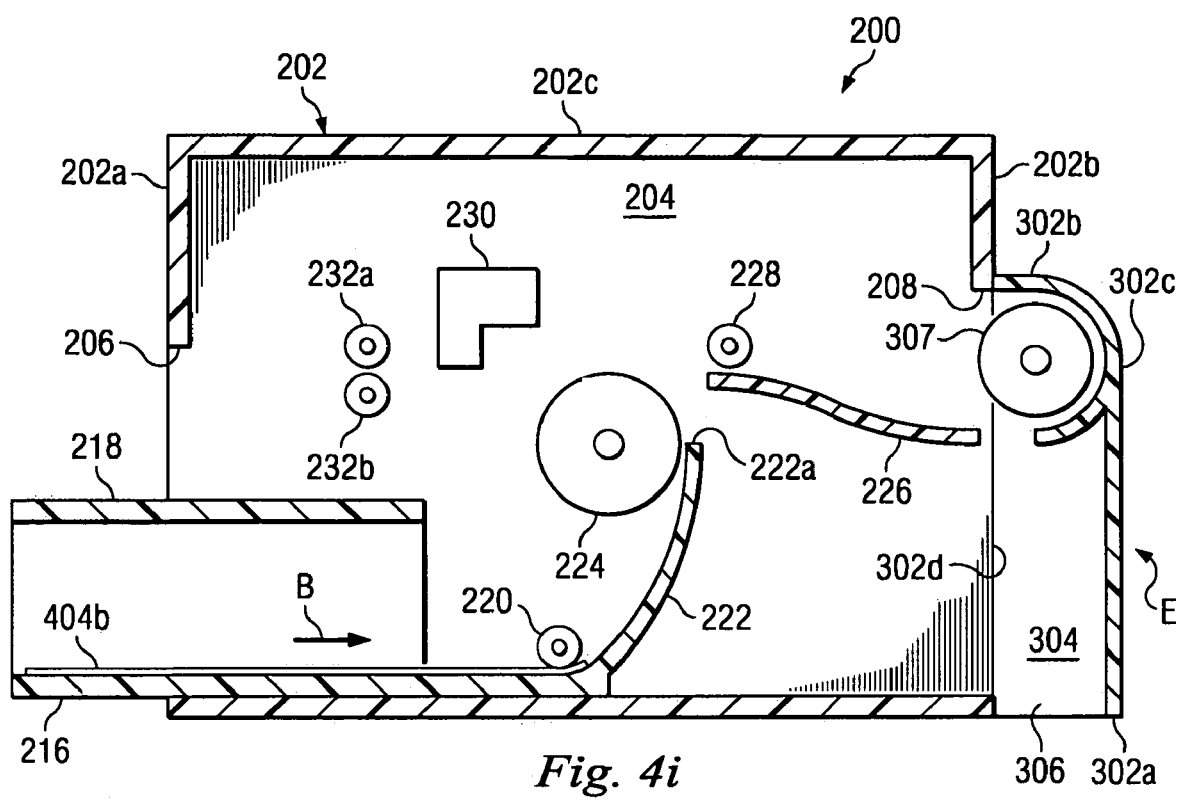
FIG. 4i is a cross sectional view illustrating an embodiment of a printing medium moving through a second paper path in the feed mechanism and the printing apparatus of FIGS. 4g and 4h.
Figure 4J:
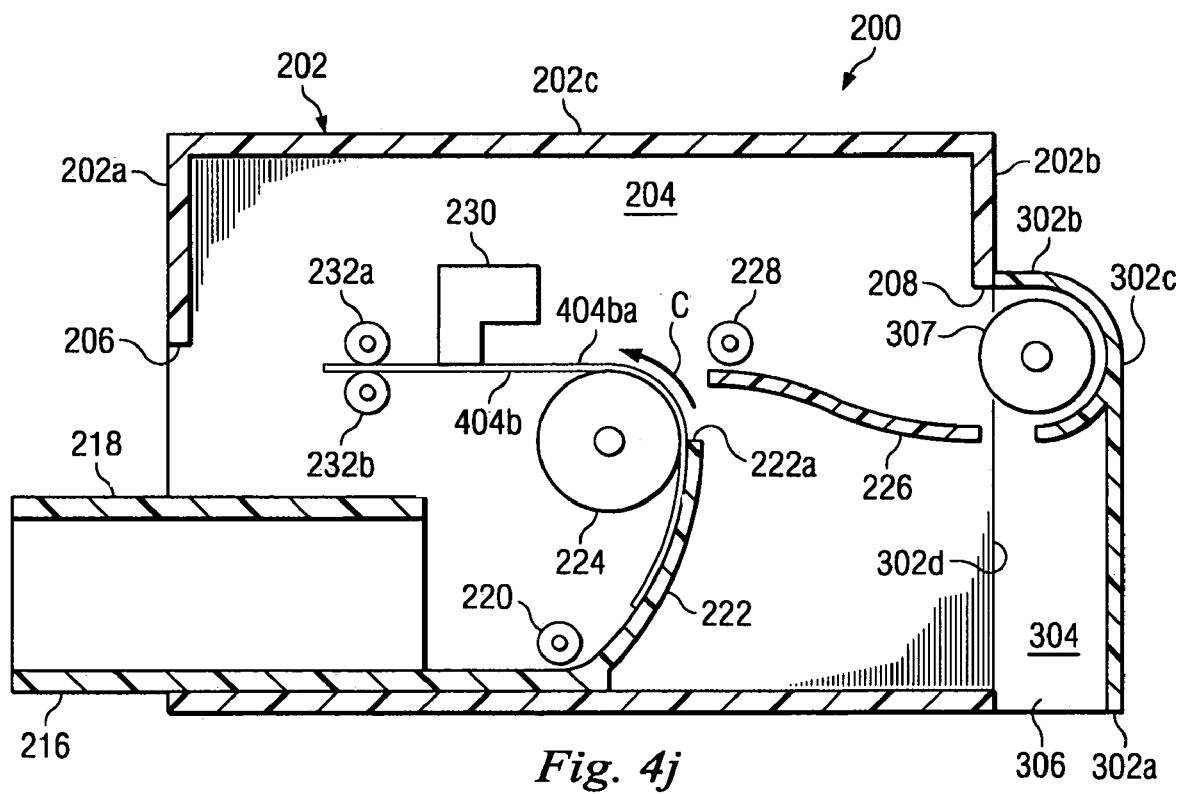
FIG. 4j is a cross sectional view illustrating an embodiment of a printing medium moving through a second paper path in the feed mechanism and the printing apparatus of FIGS. 4g and 4h.

With the feed mechanism 300 positioned in the second position E and the printing apparatus 200 set in a print duplex mode, a plurality of printing media 404b may be positioned on the printing medium input tray 216, as illustrated in FIG. 4c. The setting of the printing apparatus 200 in the print duplex mode activates a second printing medium path in the printing apparatus 200. The second printing medium path manipulates the printing medium 404b as follows: The printing medium 404b is engaged by the feed member 220, as illustrated in FIG. 4i. The feed member 220 moves the printing medium 404b in the direction B from the printing medium input tray 216, through the printing medium passageway 206, into the printing enclosure 204, and up the printing medium ramp 222 such that the printing medium 404b engages the feed member 224. The feed member 224 moves the printing medium 404b in the direction C past the printing device 230 an into engagement with the feed members 232a and 232b. As the printing medium 404b moves past the printing device 230, the printing device 230 may print images on a first side 404ba of the printing medium 404b, as illustrated in FIG. 4j.

Figure 4K:
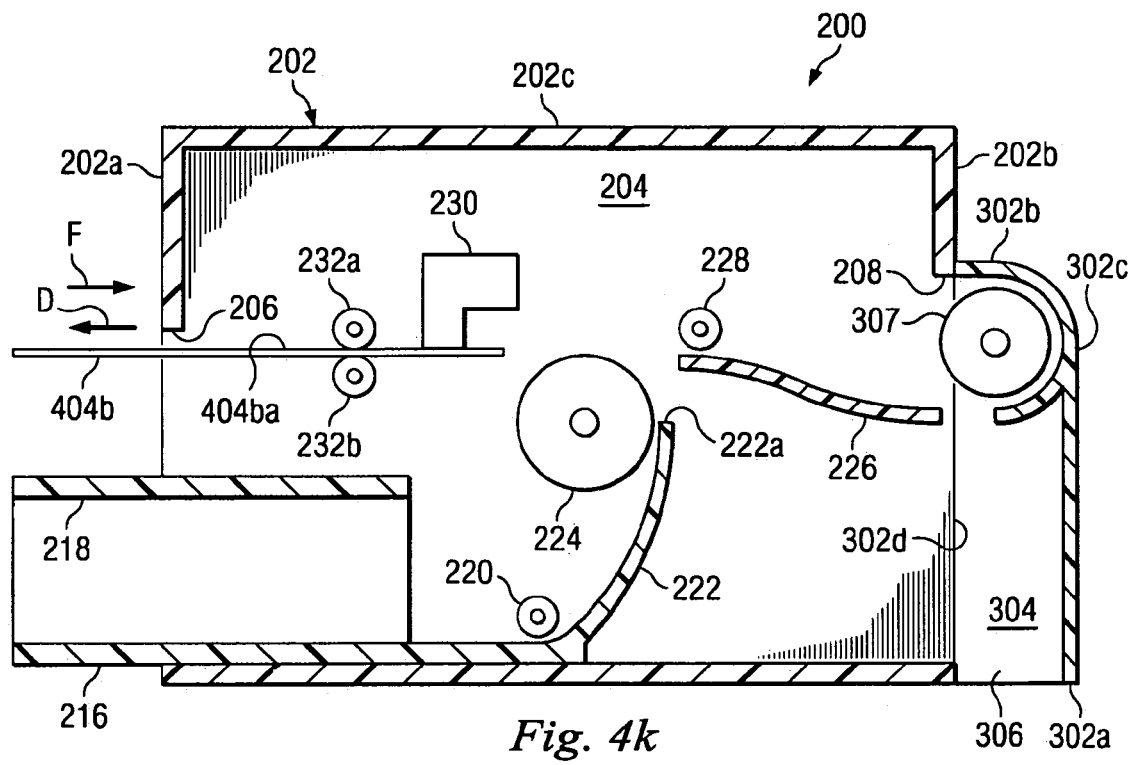
FIG. 4k is a cross sectional view illustrating an embodiment of a printing medium moving through a second paper path in the feed mechanism and the printing apparatus of FIGS. 4g and 4h.
Figure 4L:
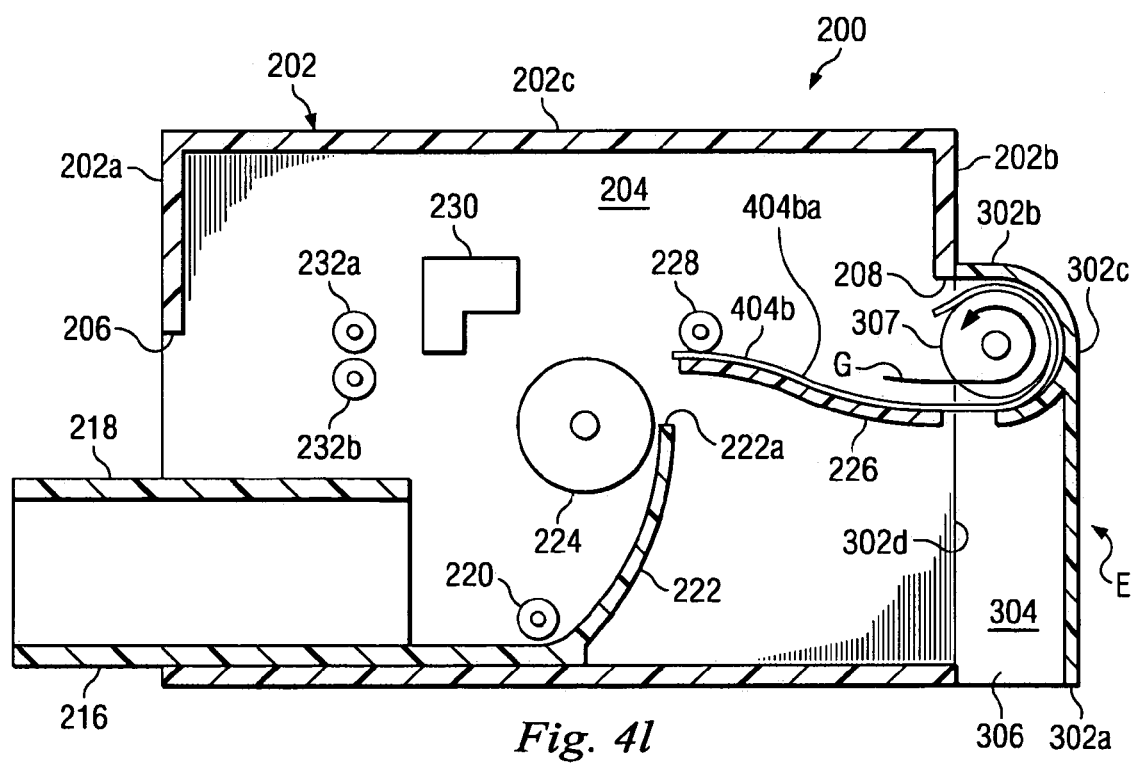
FIG. 4l is a cross sectional view illustrating an embodiment of a printing medium moving through a second paper path in the feed mechanism and the printing apparatus of FIGS. 4g and 4h.
Figure 4M:
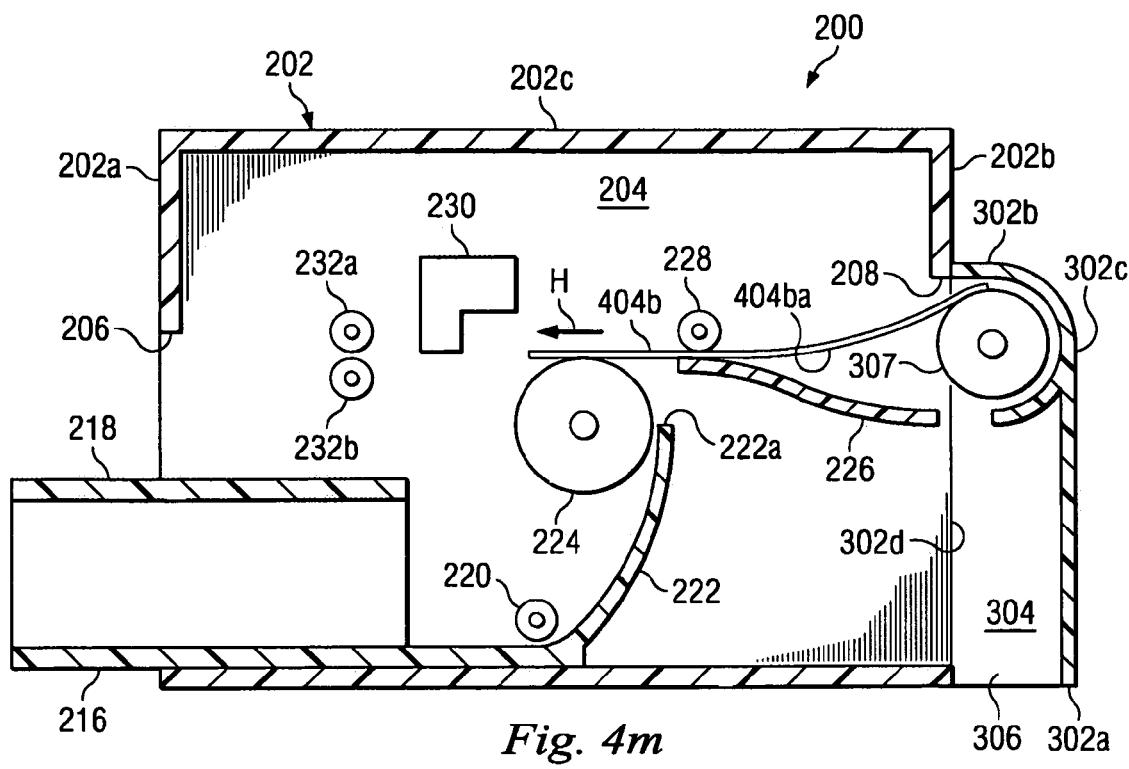
FIG. 4m is a cross sectional view illustrating an embodiment of a printing medium moving through a second paper path in the feed mechanism and the printing apparatus of FIGS. 4g and 4h.
Figure 4N:
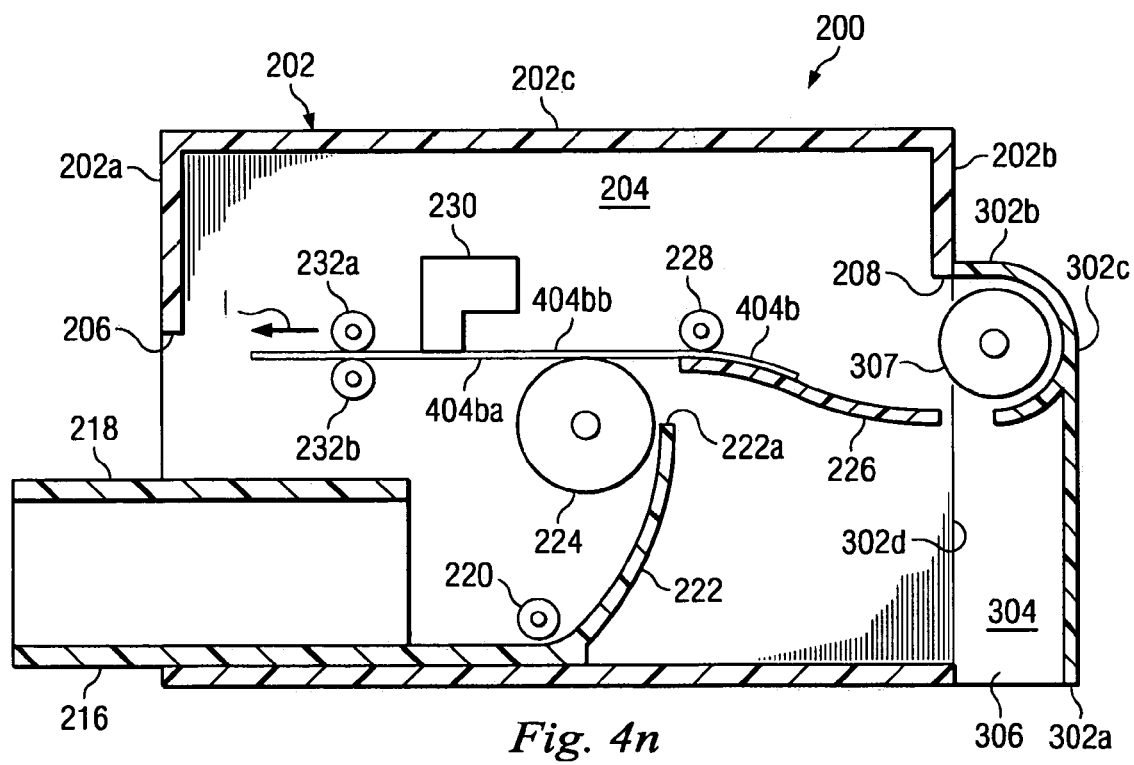
FIG. 4n is a cross sectional view illustrating an embodiment of a printing medium moving through a second paper path in the feed mechanism and the printing apparatus of FIGS. 4g and 4h.
Figure 4O:
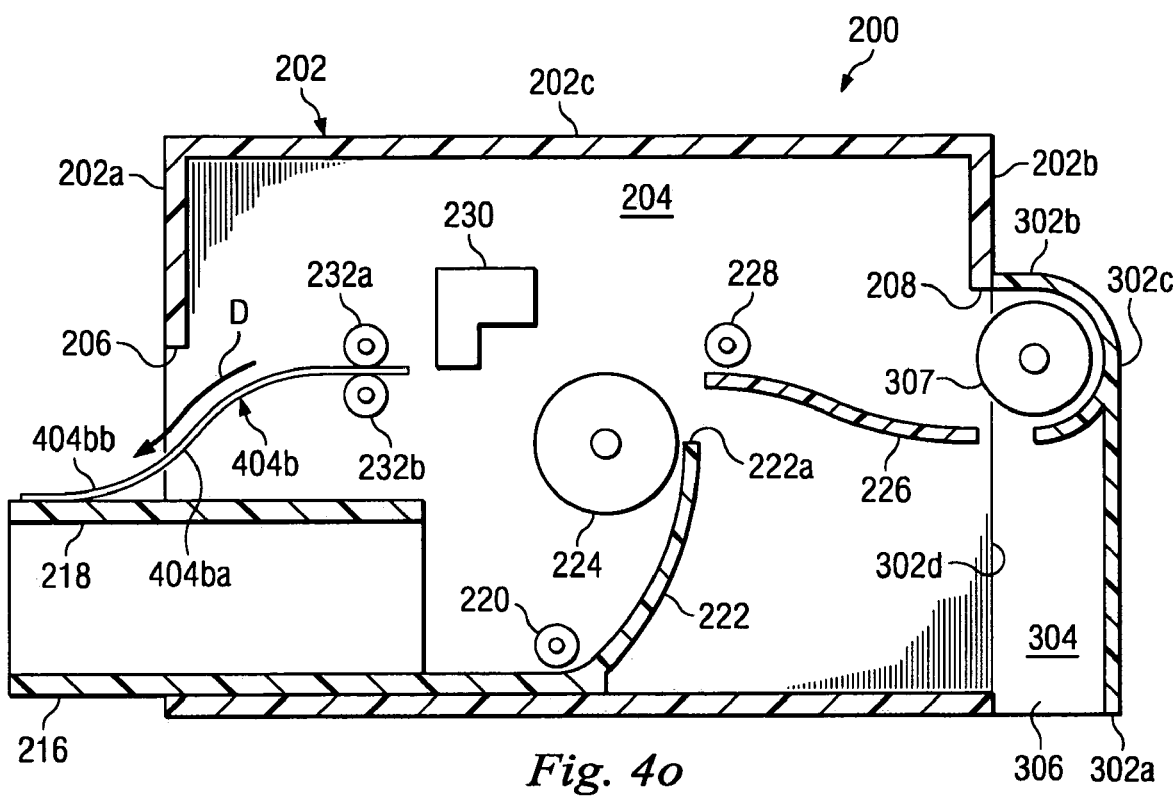
FIG. 4o is a cross sectional view illustrating an embodiment of a printing medium moving through a second paper path in the feed mechanism and the printing apparatus of FIGS. 4g and 4h.

The feed members 232a and 232b then move the printing medium 404b in the direction D, illustrated in FIG. 4k, such that the printing device 230 may print along the entire first side 404ba of the printing medium. The feed members 232a and 232b then reverse the direction of the printing medium 404b such that the printing medium 404b moves in a direction F, as illustrated in FIG. 4k. The printing medium 404b engages the feed member 224, which moves the printing medium 404b onto the printing medium ramp 226 and into engagement with the feed member 228. The feed member 228 moves the printing medium 404b along the printing medium ramp 226 and into engagement with the feed member 307 on feed mechanism 300, which moves the printing medium 404b in a direction G, as illustrated in FIG. 4l, such that the printing medium engages the printing medium ramp 226 and the feed member 228. The feed member 228 moves the printing medium 404b in a direction H such that the printing medium 404 engages the feed member 224, as illustrated in FIG. 4m. The feed member 224 moves the printing medium 404b in a direction I past the printing device 230 an into engagement with the feed members 232a and 232b. As the printing medium 404b moves past the printing device 230, the printing device 230 may print images on a second side 404bb of the printing medium 404b, as illustrated in FIG. 4n. The feed members 232a and 232b then move the printing medium 404b in the direction D through the printing medium passageway 206 and out of the printing enclosure 204 and deposit the printing medium 404b onto the printing medium output tray 218, as illustrated in FIG. 4f. In an embodiment, the printing enclosure 204 may includes a variety of different feed members, ramps, and other devices known in the art in order to provide a second printing medium path with which to print to the first side 404ba and the second side 404bb of the printing medium 404b. In an embodiment, duplex copying may be enabled using the printing apparatus 200 and the feed mechanism 300 by first copying both sides of a document using the method as described in step 404 of the method 400, then repositioning the feed mechanism 300 and printing to both sides of the printing medium as described in step 406 of the method 400. Thus, a method and apparatus are provided which allow a printing apparatus to feed documents to a copying device and to print to a plurality of sides of a printing medium using a single repositionable feed mechanism.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A printing apparatus, comprising:
a base;
a copying device coupled to the base;
a printing device coupled to the base; and
a feed mechanism which is operable to couple to the base in one of either a first position or a second position, whereby the feed mechanism is operable to feed a document to the copying device in the first position and the feed mechanism is operable to manipulate a printing medium to allow the printing device to print to a plurality of sides of the printing medium in the second position.

2. The apparatus of claim 1, wherein the base comprises a first position coupling member which is operable to couple the feed mechanism to the base in the first position.

3. The apparatus of claim 2, wherein the first position coupling member comprises a feed mechanism detection device which is operable to activate a document feed mode.

4. The apparatus of claim 1, wherein the base comprises a second position coupling member which is operable to couple the feed mechanism to the base in the second position.

5. The apparatus of claim 4, wherein the second position coupling member comprises a feed mechanism detection device which is operable to activate a print duplex mode.

6. The apparatus of claim 1, wherein the base comprises a first printing medium path, whereby the first printing medium path is activated when the feed mechanism is coupled to the base in the first position.

7. The apparatus of claim 1, wherein the base comprises a second printing medium path, whereby the second printing medium path is activated when the feed mechanism is coupled to the base in the second position.

8. The apparatus of claim 1, wherein the copying device is operable to copy a plurality of sides of a document.

9. The apparatus of claim 1, further comprising:
a print duplexing passageway defined by the base and located immediately adjacent the feed mechanism when the feed mechanism is in the second position.

10. An information handling system, comprising:
a microprocessor,
a storage coupled to the microprocessor; and
a printing apparatus coupled to the microprocessor, the printing apparatus comprising:
a base;
a copying device coupled to the base;
a printing device coupled to the base; and
a feed mechanism which is operable to couple to the base in one of either
a first position or a second position, whereby the feed mechanism is operable to feed a document to the copying device in the first position and the feed mechanism is operable to manipulate a printing medium to allow the printing device to print to a plurality of sides of the printing medium in the second position.

11. The system of claim 10, wherein the base comprises a first position coupling member which is operable to couple the feed mechanism to the base in the first position.

12. The system of claim 11, wherein the first position coupling member comprises a feed mechanism detection device which is coupled to the microprocessor and operable to detect the feed mechanism when the feed mechanism is coupled to the first position coupling member.

13. The system of claim 10, wherein the base comprises a second position coupling member which is operable to couple the feed mechanism to the base in the second position.

14. The system of claim 13, wherein the second position coupling member comprises a feed mechanism detection device which is coupled to the microprocessor and operable to detect the feed mechanism when the feed mechanism is coupled to the second position coupling member.

15. The system of claim 10, wherein the base comprises a first printing medium path, whereby the microprocessor activates the first printing medium path when the feed mechanism is coupled to the base in the first position.

16. The system of claim 10, wherein the base comprises a second printing medium path, whereby the microprocessor activates the second printing medium path when the feed mechanism is coupled to the base in the second position.

17. The system of claim 10, wherein the copying device is operable to copy a plurality of sides of a document to the storage.

18. The system of claim 10, wherein the printing device is operable to print a plurality of data stored in the storage to a printing medium.

19. A method for printing, comprising:
    providing a printing apparatus comprising a base, a copying device coupled to the base, and a printing device coupled to the base;
    coupling a feed mechanism to the base in a first position and feeding a document to the copying device with the feed mechanism; and
    coupling the feed mechanism to the base in a second position and manipulating a printing medium with the feed mechanism to allow the printing device to print to a plurality of sides of the printing medium.

20. The method of claim 19, wherein the coupling the feed mechanism to the base in the first position activates a first printing medium path and the coupling the feed mechanism to the base in the second position activates a second printing medium path.

21. A printing apparatus, comprising:
    a document printer having a first input and a second input;
    a feeder movable between a first position on the document printer and a second position on the document printer;
    the document printer having a document feed mode and a print duplex mode for:
    copying both sides of a document in response to the feeder being in the first position, document printer being in the document feed mode and the document being fed into the first input;
    printing one side of the document in response to the feeder being in the first position, document printer being in the document feed mode and the document being fed into the second input; and
    printing both sides of the document in response to the feeder being in the second position, document printer being in the print duplex mode and the document being fed into the second input.

* * * * *